(12) United States Patent
Bunch et al.

(10) Patent No.: US 10,911,225 B2
(45) Date of Patent: Feb. 2, 2021

(54) OPTIMIZABLE FULL-PATH ENCRYPTION IN A VIRTUALIZATION ENVIRONMENT

(71) Applicant: Nutanix, Inc., San Jose, CA (US)

(72) Inventors: Alexander Michael Bunch, San Jose, CA (US); Miao Cui, New York, NY (US); Ajay Prakash Kulkarni, Santa Clara, CA (US); Peter Alan Turshmid, Seattle, WA (US)

(73) Assignee: Nutanix, Inc., San Jose, CA (US)

( * ) Notice: Subject to any disclaimer, the term of this patent is extended or adjusted under 35 U.S.C. 154(b) by 85 days.

(21) Appl. No.: 15/172,952

(22) Filed: Jun. 3, 2016

(65) Prior Publication Data

US 2016/0359622 A1    Dec. 8, 2016

Related U.S. Application Data

(60) Provisional application No. 62/171,981, filed on Jun. 5, 2015.

(51) Int. Cl.
*H04L 9/08* (2006.01)
*H03M 7/30* (2006.01)
*H04L 29/08* (2006.01)
*G06F 21/62* (2013.01)
*G06F 9/455* (2018.01)
*H04L 29/06* (2006.01)

(52) U.S. Cl.
CPC ........ *H04L 9/0822* (2013.01); *G06F 9/45558* (2013.01); *G06F 21/6218* (2013.01); *H03M 7/30* (2013.01); *H04L 67/1097* (2013.01); *G06F 2009/45587* (2013.01); *G06F 2009/45595* (2013.01); *H04L 63/0272* (2013.01); *H04L 63/0428* (2013.01); *H04L 63/164* (2013.01); *H04L 2463/062* (2013.01)

(58) Field of Classification Search
CPC ........................... H04L 9/0822; G06F 9/45558
USPC ......................................................... 713/171
See application file for complete search history.

(56) References Cited

U.S. PATENT DOCUMENTS

| 7,350,081 B1 * | 3/2008 | Best ........................ G06F 21/10 380/279 |
| 8,010,810 B1 | 8/2011 | Fitzgerald et al. |
| 8,041,941 B2 | 10/2011 | Walter et al. |
| 8,549,518 B1 | 10/2013 | Aron et al. |

(Continued)

OTHER PUBLICATIONS

IBM, IBM SmartCloud Virtual Storage Center Solution, May 31, 2013, IBM, tips0991, pp. 1-13. (Year: 2013).*

(Continued)

*Primary Examiner* — Peter C Shaw
(74) *Attorney, Agent, or Firm* — Vista IP Law Group, LLP

(57) ABSTRACT

An approach for full-path data encryption, where user virtualized computers (e.g., user VMs) are configured to communicate with other virtualized computers or VMs using IPsec protocol encryption standards. The user VMs may send a first encryption or authorization key to the other VMs, which the other VMs may use to authenticate the user VMs and encrypt and decrypt data stored to storage devices using a second encryption key. In some approaches, the other VMs may interpret or decrypt the data sent via IPsec and then perform data optimizations (e.g., compression, deduplication) on the data before decrypting/encrypting with the second key.

23 Claims, 11 Drawing Sheets

(56) References Cited

U.S. PATENT DOCUMENTS

| | | | |
|---|---|---|---|
| 8,555,087 B2* | 10/2013 | Chasen | G11B 20/00086 380/200 |
| 8,601,473 B1 | 12/2013 | Aron et al. | |
| 8,850,130 B1 | 9/2014 | Aron et al. | |
| 9,397,753 B2 | 7/2016 | Skirmont et al. | |
| 9,575,673 B2* | 2/2017 | Mitkar | G06F 3/0619 |
| 9,735,962 B1* | 8/2017 | Yang | H04L 9/0897 |
| 9,772,866 B1 | 9/2017 | Aron et al. | |
| 2002/0169971 A1* | 11/2002 | Asano | G06F 21/10 713/193 |
| 2004/0143733 A1 | 7/2004 | Ophir et al. | |
| 2007/0055891 A1* | 3/2007 | Plotkin | G06F 21/6236 713/189 |
| 2009/0110195 A1 | 4/2009 | Paykin et al. | |
| 2009/0119504 A1 | 5/2009 | Van Os et al. | |
| 2009/0220080 A1* | 9/2009 | Herne | H04L 63/0428 380/255 |
| 2011/0093740 A1* | 4/2011 | Tsao | H04L 67/1034 714/4.12 |
| 2012/0148050 A1* | 6/2012 | Lewis | H04L 63/06 380/278 |
| 2013/0219169 A1 | 8/2013 | Del Signore et al. | |
| 2013/0283038 A1* | 10/2013 | Kulkarni | H04L 9/0861 713/153 |
| 2014/0006350 A1* | 1/2014 | Fukui | G06F 16/178 707/632 |
| 2014/0010371 A1 | 1/2014 | Khazan et al. | |
| 2014/0040639 A1 | 2/2014 | Raam | |
| 2014/0108854 A1* | 4/2014 | Antony | G06F 11/203 714/4.2 |
| 2015/0089244 A1 | 3/2015 | Roth et al. | |
| 2015/0095581 A1* | 4/2015 | Stairs | G06F 12/084 711/130 |
| 2016/0285832 A1* | 9/2016 | Petrov | H04L 63/0428 |
| 2017/0346625 A1* | 11/2017 | Yan | H04L 9/0825 |

OTHER PUBLICATIONS

International Search Report and Written Opinion dated Apr. 7, 2017 for corresponding PCT Application No. PCT/US16/35927, 12 pages.
U.S. Appl. No. 13/207,375, filed Aug. 10, 2011, 45 pages.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
European Extended Search Report dated Oct. 5, 2018 for corresponding EP Application No. 16839742.0, 11 pages.
Brocade Communications, "Brocade Encryption Switch/FS8-18 Cryptographic Module Security Policy Document Version 2.3", (Dec. 15, 2009).
Brocade, "Brocade Encryption Switch", Data Sheet, (Sep. 2009).
Brocade, "Brocade Encryption Switch", Data Sheet, (Jul. 2013).
NetApp, "Brocade Encryption Switch and Brocade FS8-18 Encryption Blade—Frequently Asked Questions", NetApp Sales FAQ, (Apr. 2011).

* cited by examiner

OPTIMIZABLE FULL-PATH ENCRYPTION IN A VIRTUALIZATION ENVIRONMENT

CROSS-REFERENCE TO RELATED APPLICATIONS

This present application claims the benefit of U.S. Provisional Application No. 62/171,981 filed Jun. 5, 2015, which is hereby incorporated by reference in its entirety. This present application is related to U.S. Pat. No. 8,601, 473, titled "ARCHITECTURE FOR MANAGING I/O AND STORAGE FOR A VIRTUALIZATION ENVIRONMENT", U.S. Pat. No. 8,850,130, titled "METADATA FOR MANAGING I/O AND STORAGE FOR A VIRTUALIZATION ENVIRONMENT", U.S. patent application Ser. No. 13/207,375, titled "METHOD AND SYSTEM FOR IMPLEMENTING FAST DATA CONVOLUTION USING SLIDING WINDOWS", which are hereby incorporated by reference in its entirety.

FIELD

This disclose concerns a method and system for providing optimizable full-path encryption in a virtualization environment.

BACKGROUND

Recently, virtualization environments deploying virtualized computers, such as virtual machines and containers (e.g., LXC, Dockerized applications), have grown in industry use. Though these new virtualization technologies afford organizations great flexibility in "on-the-fly" provisioning of resources, among other benefits, several security and performance issues have arisen. For example, if single physical computer hosts two virtualized computers (e.g., VM-A and VM-B) that implement a web-commerce site, malicious users (e.g., identity/data thieves) may tap communications between VM-A and VM-B and steal/copy sensitive data, such as credit card information, or other network communications generally.

One conventional approach used to thwart such attacks involves installing an encryption driver or program on the virtualized computers, such that the all communications in/out of the virtualized computers are encrypted. For instance, VM-A may have an encryption driver that encrypts all out-bound data.

While this approach improves network security, it hampers network/storage data optimizations. For instance, if a network/storage system tries to compress the data encrypted by VM-A to save space, the compression algorithms will yield low-compression results since encrypted data is not readily compressible. Further, installing an encryption driver in every virtualized computer can increase computational overhead for the VMs, which can result in low system performance (e.g., sluggish VMs).

As such, there is a demand for improved security in virtualization systems that does not sacrifice network/storage performance.

SUMMARY

In some embodiments, user virtualized computers (e.g., user VMs) are configured to communicate with other virtualized computers or VMs using an internet layer security protocol such as an Internet Protocol Security ("IPsec") protocol encryption standards. The user VMs may send a first encryption or authorization key to the other VMs, which the other VMs may use to authenticate the user VMs and encrypt and decrypt data stored to storage devices using a second encryption key. In some embodiments, the other VMs can interpret or decrypt the data sent via IPsec and then perform data optimizations (e.g., compression, deduplication) on the data before decrypting/encrypting with the second key.

Further details of aspects, objects, and advantages of some embodiments are described below in the detailed description, drawings, and claims. Both the foregoing general description and the following detailed description are exemplary and explanatory, and are not intended to be limiting as to the scope of the embodiments.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION

Figure 1:
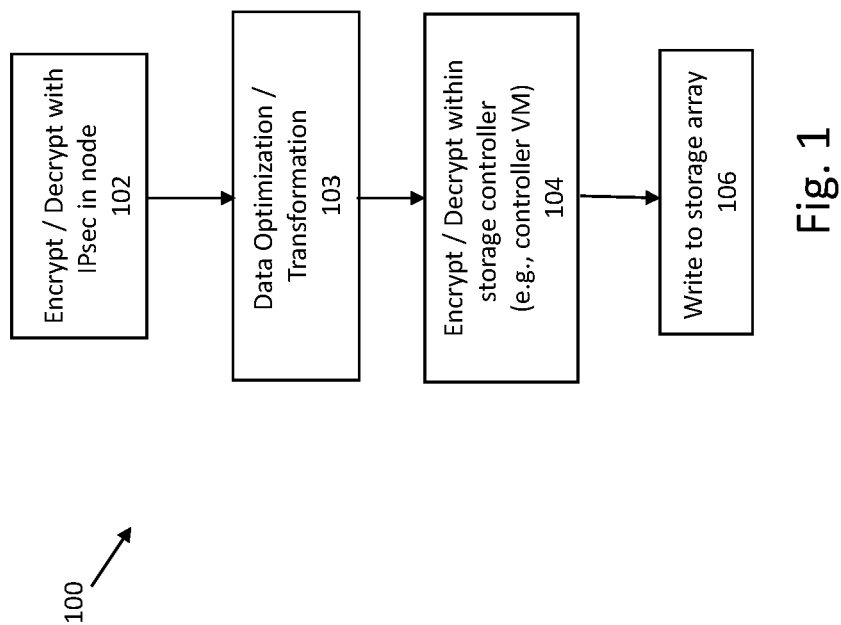
FIG. 1 shows a high-level flowchart for an approach for optimizable full-path encryption, as according to some embodiments.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding. In some embodiments, a plurality of virtualized computers, such as virtual machines (VMs) and containers (e.g., Linux containers, Dockerized applications) are configured to network through an encryption protocol, such as IPsec and encrypt and decrypt data to storage devices using a two-key encryption scheme. For example, in some embodiments a user VM may be configured to communicate with a service/controller VM using IPsec to encrypt and decrypt data between the two VMs. The user VM may send a first key, a "key encryption key" (KEK) to the controller VM so that the controller VM may authenticate the user VM. The controller VM may use the first key to decrypt a second key, a "data encryption key" (DEK). The second key may be used to encrypt data received from the user VM. The data encrypted by the DEK can then be transported and stored in a storage pool in encrypted form. In this way, network data that is "in-flight" between two virtualized computers is protected by IPsec, and data that is permanently stored by the controller VM is protected using the two-key approach. Although the embodiments are described using user VMs and controller VMs, one of ordinary skill in the art appreciates the embodiments may also function having user container instances and controller container instances as described below at FIG. 7B.

One advantage of the above approach is increased security due to the controller VM authenticating the user VM using the KEK. Further, since the controller VM and user VM can "understand" one another (e.g., encrypting/decrypting data) using IPsec, the controller VM can optimize the data received from the user VM. For example, the controller VM may decrypt data received from the user VM via IPsec then perform data optimization and/or transformations (e.g., compression, deduplication, encode differently) on the decrypted data before encrypting the optimized/transformed data with the DEK for long-term storage.

IPsec is a protocol suite for secure Internet Protocol (IP) communications by authenticating and encrypting each IP packet of a communication session. IPsec includes protocols for establishing mutual authentication between agents at the beginning of the session and negotiation of cryptographic keys to be used during the session. IPsec can be used in protecting data flows between a pair of hosts (host-to-host), between a pair of security gateways (network-to-network), between a pair of VMs (user VM-to-controller VM), or between a security gateway and a host (network-to-host). IPsec uses cryptographic security services to protect communications over IP networks. IPsec supports network-level peer authentication, data origin authentication, data integrity, data confidentiality (encryption), and replay protection.

IPsec is an end-to-end security scheme operating in the Internet Layer of the Internet Protocol Suite, while some other Internet security systems in widespread use, such as Transport Layer Security (TLS) and Secure Shell (SSH), operate in the upper layers at the Application layer. Hence, only IPsec protects all application traffic over an IP network. Applications can be automatically secured by IPsec at the IP layer. One of ordinary skill in the art appreciates that IPsec is one type of an internet layer security protocol. Other types of internet layer protocols may also include secure socket language ("SSL").

The IPsec suite is an open standard. IPsec uses the following protocols to perform various functions:
  Authentication Headers (AH) provide connectionless data integrity and data origin authentication for IP datagrams and provides protection against replay attacks.
  Encapsulating Security Payloads (ESP) provide confidentiality, data-origin authentication, connectionless integrity, an anti-replay service (a form of partial sequence integrity), and limited traffic-flow confidentiality.
  Security Associations (SA) provide the bundle of algorithms and data that provide the parameters necessary for AH and/or ESP operations. The Internet Security Association and Key Management Protocol (ISAKMP) provides a framework for authentication and key exchange with actual authenticated keying material provided either by manual configuration with pre-shared keys, Internet Key Exchange (IKE and IKEv2), Kerberized Internet Negotiation of Keys (KINK), or IPSECKEY.

FIG. 1 shows a high-level flowchart 100 for an approach for optimizable full-path encryption in a virtualization environment, as according to some embodiments. A first virtualized computer, such as a user VM or container encrypts a network communication directed to a second virtualized computer, such as a controller VM, using an initialized IPsec session. In some embodiments, the network communication sent by the user VM is in the form of an iSCSI request. At 102, the controller VM receives the network communication and decrypts the network communication via IPsec.

In some embodiments, at 103, once the controller VM decrypts the network communication received from the user VM, the controller VM may perform optional data optimizations and transformations (e.g., compression, deduplication) on the decrypted network communication to increase network/storage performance. At 104, the controller VM may then use a two-key authentication/encryption scheme (e.g., KEK/DEK-scheme) to encrypt the optimized/transformed network communication into encrypted data for long-term storage in the storage devices. At 106, once the network communication is encrypted, the encrypted optimized network communication/data may be sent to the network storage devices for permanent storage. In this way, data "in-flight" between two virtualized computers is protected through IPsec, while data "at rest" (e.g., stored in the storage devices) is protected through the two-key authentication/encryption scheme. Though, only encryption using the DEK is mentioned above for clarity/brevity, one of ordinary skill in the art appreciates the above flow may operate in the reverse direction (e.g., reading from the storage array using the two-key scheme to decrypt the retrieved encrypted data from the storage pool before optimizing/transforming the decrypted data and transporting the decrypted data to the user VM from the controller VM through IPsec, at which point the decrypted transformed data is encrypted via IPsec for transfer from the controller VM to the user VM. This reading process is further discussed below in FIG. 4d). Further, one of ordinary skill in the art appreciates that the features recited can be combined/customized per implementation. For example, in some embodiments, the data optimizations/transformations may be skipped to expedite the storage process.

Figure 2:
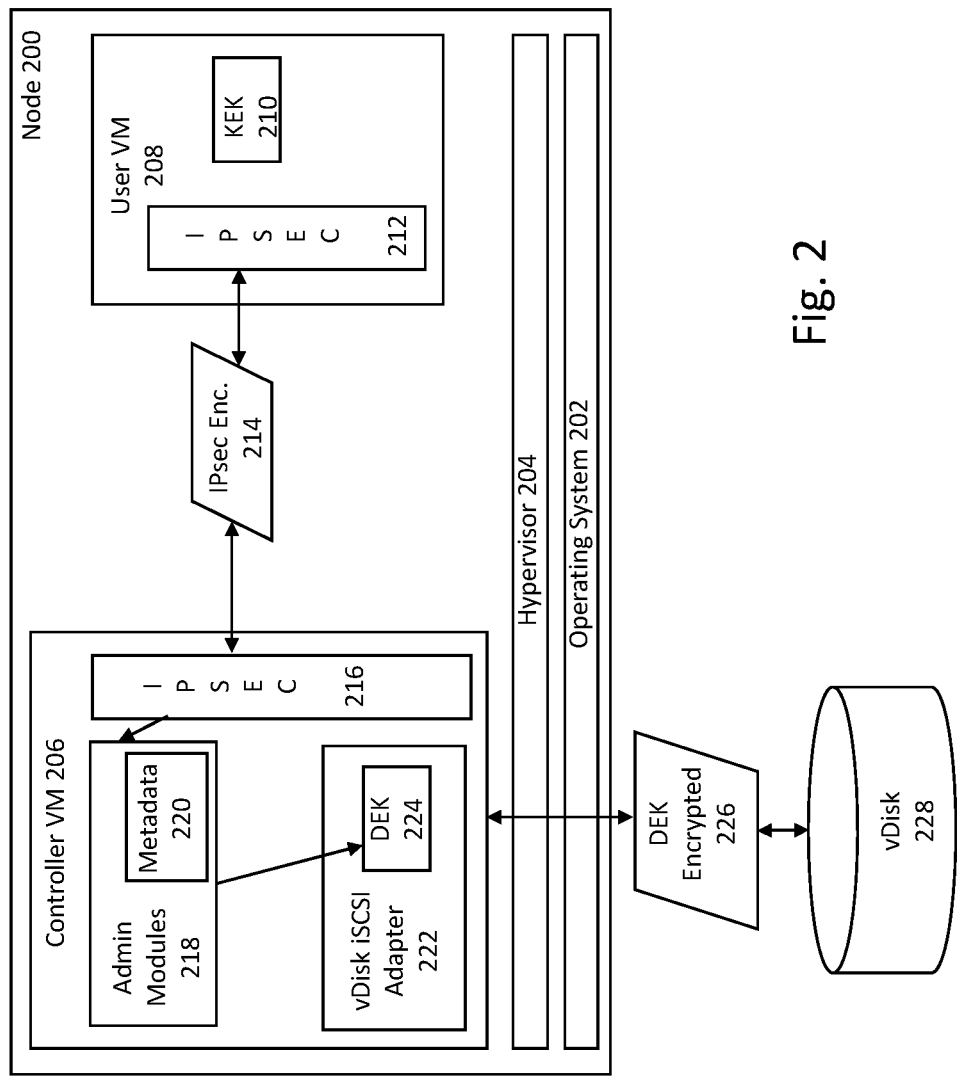
FIG. 2 illustrates an example virtualization system that may be implemented optimizable full-path encryption, as according to some embodiments.

FIG. 2 illustrates an example virtualization system, e.g., node 200, that may be implemented for optimizable full-path encryption. In some embodiments, node 200 is a physical computer with memory, and one or more processors (e.g., processor cores). The node 200 may comprise an operating system 202 and a hypervisor 204 installed on the operation system 202. In some embodiments, the hypervisor is installed directly on the node 200 (e.g., bare metal hypervisor). The hypervisor 204 is configured to support/instantiate one or more virtual machines, such as user VM 208 and controller VM 206. The controller VM 206 is configured as a virtualized storage controller functioning above the hypervisor 204, as explained in further detail below. Though FIG. 2 illustrates node 200 using virtual machines as its virtualized computers, one of ordinary skill in the art appreciates the containers (e.g., Linux containers, Dockerized applications) may be implemented in-place-of or combined-with virtual machines. For example, a node may be implemented with a user container in place of user VM 208, a controller container instance in place of controller VM 206, and a daemon instead of a hypervisor (containers are further disclosed below in FIG. 7B).

In some embodiments, user VM 208 is configured to send a network communication/network data to controller VM 206 via IPsec. For example, user VM 208 may use an IPsec module 212 to generate IPsec encrypted data 214 that the controller VM 206 receives and decrypts using its own IPsec module 216. Once the controller VM 206 decrypts the data though the IPsec module 216, the controller VM 206 may use one or more admin modules 218 that run in the user-space of the controller VM 206 to analyze, optimize, and/or transform the data using the metadata 220, as explained in further detail below.

Further details regarding methods and mechanisms for implementing Metadata 220 are described below and in U.S. Pat. No. 8,850,130, titled "METADATA FOR MANAGING I/O AND STORAGE FOR A VIRTUALIZATION ENVIRONMENT", which is hereby incorporated by reference in its entirety.

In some embodiments, a two-key encryption scheme may be implemented for further data security. In particular, a first encryption key, a key authorization key (KEK), may be used to decrypt a second key, the data encryption key (DEK), after which the DEK may be used to actually encrypt the data.

Referring to FIG. 2, in some embodiments, the KEK and DEK are used to authenticate then encrypt the data as follows. The user VM sends a KEK 210 to the controller VM 206. The controller VM 206 generates a hash of the received KEK 210 and compares it to a previously saved KEK hash value to authenticate the received KEK 210. The KEK 210 may then be used to try to decrypt the DEK 224. If the KEK 210 decrypts the DEK 224 then the controller VM 206 has effectively authenticated the user VM 208 and the operations continues. However, if the KEK 210 does not successfully decrypt the DEK 224, the controller VM 206 aborts the operation or sends an error message and does not continue the transaction. In this way, the KEK (e.g., the hash of the KEK 210) may function as an authentication key that authenticates the user VM 208.

In some embodiments, the KEK 210 is stored in the user VM 208 and sent with the IPsec encrypted data 214. The controller VM 206 may authenticate the user VM 208 for an entire session or network transaction or for a certain period of time. Thus, the KEK may only need to be sent once to authenticate the communication such as for an entire session or for a certain period of time. While in some embodiments, the controller VM 206 may require that the KEK be sent with every communication or be periodically sent to renew authentication. Further, in some embodiments, a plurality of user VMs or virtualized computers is implemented within a node (e.g., node 200) and each user VM comprises its own KEK hash, that corresponds to a DEK within the controller VM 206. In those embodiments using multiple key-pairs, the controller VM 206 may store all the DEKs and may use appropriate/corresponding DEK to authenticate each user VM.

As illustrated in FIG. 2, in some embodiments, the DEK 224 is stored within a vDisk iSCSI adapter 222. The vDisk iSCSI adapter 222 is configured to transform the I/O request received from the user VM 208 into a request destined to a global storage pool (see FIG. 3). For example, once authenticated using the KEK, the iSCSI adapter 222 may use the DEK 224 to encrypt the data received from the user VM 208 and send the data as DEK encrypted data 226 for long-term or persistent storage in a vDisk 228. Even though FIG. 2 shows a vDisk iSCSI adapter 222, one of ordinary skill in the art appreciates the vDisk iSCSI adapter 222 can be any type of adapter or driver that writes data into or reads data from a database or physical storage such as a Network File System ("NFS") driver.

In this way, VMs can use the vDisks as encrypted hardware without requiring large changes being made to the VMs or requiring additional hardware/firmware. That is, the VMs may communicate or treat the vDisks as conventional self-encrypting "physical" disks (e.g., using a KEK/DEK, etc.), though in the actual implemented system, the controller VM is handling the encryption for the vDisks using the KEK/DEK-scheme and exposing the vDisks to the user VM through an encrypted channel (e.g., IPsec). A further advantage of these embodiments is that because the controller VM handles the encryption process, the vDisk may be structured from the global storage pool including SSDs, networked storage devices and/or cloud storage, as discussed below in FIG. 3.

In some embodiments, the vDisk 228 may be stored in a hardware/physical memory, which has hardware-based KEK/DEK (e.g., two-key) encryption security. For example, DEK encrypted data 226 is stored to the vDisk (a virtualized disk), which is further stored in a self-encrypting disk (SED) which may be a physical storage device (e.g., SED, self-encrypting HDD, self-encrypting SSD) with self-encrypting hardware, such as a chip.

When data writes comprising the vDisk data are written to the physical disk, the data is again encrypted at the hardware level in seamless or transparent fashion (e.g., transparent to the user VM and the controller VM). In some embodiments, the operating system ("OS") 202 or node 200 is configured to work with the physical SED drive such that all writes to the SED drive are encrypted. In some embodiments, the OS 202 or node 200 may use a hardware-based KEK (that is separate and different from the KEK 210) as an authorization key to access and use a DEK that is within the physical SED drive. Then the DEK within the physical drive is used to encrypt the data for final long-term "at-rest" storage. In this way, the data may be twice encrypted while at rest: (1) once by the DEK 224 and (2) a second time by the DEK within the physical drive.

Still in some embodiments, the KEK within the virtualization environment (e.g., KEK 210) is used to access/decrypt the physical-based DEK within the physical disk, which is then used to encrypt data for at-rest storage. In this embodiment, the data to-be-written may not be encrypted en-route to the physical drive, but once written to the physical drive, the physical-based DEK is used to encrypt the data for at-rest storage. One of ordinary skill in the art appreciates while FIG. 2 describes VMs, containers may also be used in place of or in conjunction with the VMs.

Figure 3:
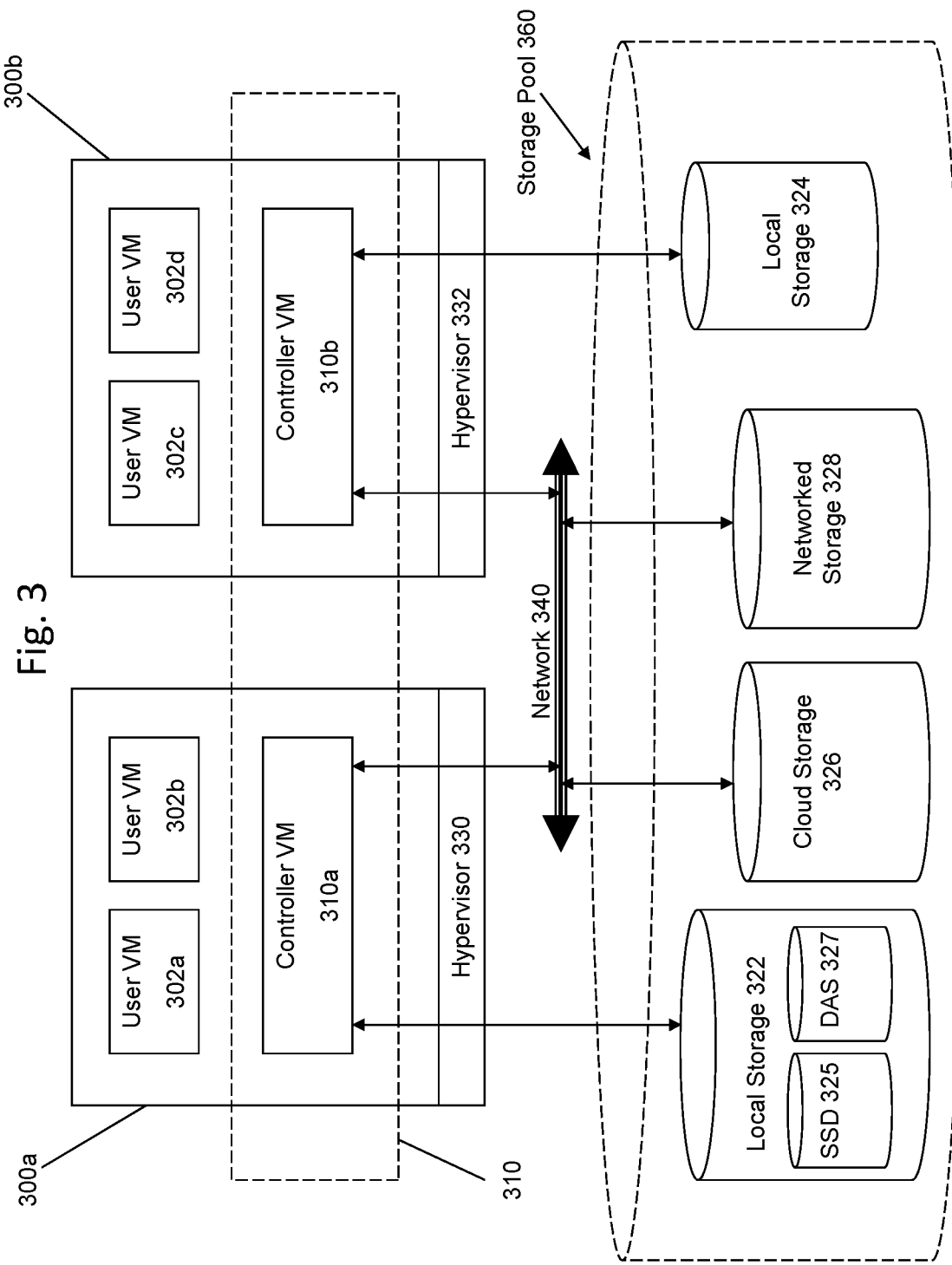
FIG. 3 illustrates an example virtualization architecture that may be used to implement efficient full-path encryption, as according to some embodiments.

FIG. 3 illustrates an architecture for implementing storage management in a virtualization environment according to some embodiments of the invention. The architecture of FIG. 3 can be implemented for a distributed platform that contains multiple servers 300a and 300b that manages multiple-tiers of storage. The multiple tiers of storage include storage that is accessible through a network 340, such as cloud storage 326 or networked storage 328 (e.g., a SAN or "storage area network"). Unlike the prior art, the present embodiment also permits local storage 322/324 that is within or directly attached to the server and/or appliance to be managed as part of the storage pool 360. Examples of such storage include Solid State Drives (henceforth "SSDs") 325 or Hard Disk Drives (henceforth "HDDs" or "spindle drives") 327. These collected storage devices, both local and networked, form a storage pool 360. Virtual disks (or "vDisks") can be structured from the storage devices in the storage pool 360, as described in more detail below. As used herein, the term vDisk refers to the storage abstraction that is exposed by a Controller VM to be used by a user VM. In some embodiments, the vDisk is exposed via iSCSI ("internet small computer system interface") or NFS ("network file system") and is mounted as a virtual disk on the user VM.

Each server 300a or 300b runs virtualization software, such as VMware ESX(i), Microsoft Hyper-V, or RedHat KVM. The virtualization software includes a hypervisor 330/332 to manage the interactions between the underlying hardware and the one or more user VMs 302a, 302b, 302c, and 302d that run client software.

A special VM 310a/310b is used to manage storage and I/O activities according to some embodiment of the invention, which is referred to herein as a "Controller VM". This is the "Storage Controller" in the currently described architecture. Multiple such storage controllers coordinate within a cluster to form a single-system. The Controller VMs 310a/310b are not formed as part of specific implementations of hypervisors 330/332. Instead, the Controller VMs run as virtual machines above hypervisors 330/332 on the various servers 302a and 302b, and work together to form a distributed system 310 that manages all the storage resources, including the locally attached storage 322/324, the networked storage 328, and the cloud storage 326. Since the Controller VMs run above the hypervisors 330/332, this means that the current approach can be used and implemented within any virtual machine architecture, since the Controller VMs of embodiments of the invention can be used in conjunction with any hypervisor from any virtualization vendor.

Each Controller VM 310a-b exports one or more block devices or NFS server targets that appear as disks to the client VMs 302a-d. These disks are virtual, since they are implemented by the software running inside the Controller VMs 310a-b. Thus, to the user VMs 302a-d, the Controller VMs 310a-b appear to be exporting a clustered storage appliance that contains some disks. All user data (including the operating system) in the client VMs 102a-d resides on these virtual disks.

Significant performance advantages can be gained by allowing the virtualization system to access and utilize local (e.g., server-internal) storage 322 as disclosed herein. This is because I/O performance is typically much faster when performing access to local storage 322 as compared to performing access to networked storage 328 across a network 340. This faster performance for locally attached storage 322 can be increased even further by using certain types of optimized local storage devices, such as SSDs 325.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 322. On the other hand, data that does not require fast access or which is accessed infrequently can be stored in the networked storage devices 328 or in cloud storage 326.

Another advantage provided by this approach is that administration activities can be handled on a much more efficient granular level. Recall that the prior art approaches of using a legacy storage appliance in conjunction with VMFS heavily relies on what the hypervisor can do at its own layer with individual "virtual hard disk" files, effectively making all storage array capabilities meaningless. This is because the storage array manages much coarser grained volumes while the hypervisor needs to manage finer-grained virtual disks. In contrast, the present embodiment can be used to implement administrative tasks at much smaller levels of granularity, one in which the smallest unit of administration at the hypervisor matches exactly with that of the storage tier itself.

Yet another advantage of the present embodiment of the invention is that storage-related optimizations for access and storage of data can be implemented directly within the primary storage path. For example, in some embodiments of the invention, the Controller VM 310a can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Controller VMs include quality of service (QOS) functions, encryption, and compression. The new architecture massively parallelizes storage, by placing a storage controller—in the form of a Controller VM—at each hypervisor, and thus makes it possible to render enough CPU and memory resources to achieve the aforementioned optimizations. Further details regarding an exemplary approach for implementing the virtualization environment are described in U.S. Pat. No. 8,601,473, titled "ARCHITECTURE FOR MANAGING I/O AND STORAGE FOR A VIRTUALIZATION ENVIRONMENT", which is hereby incorporated by reference in its entirety.

Figure 4A:
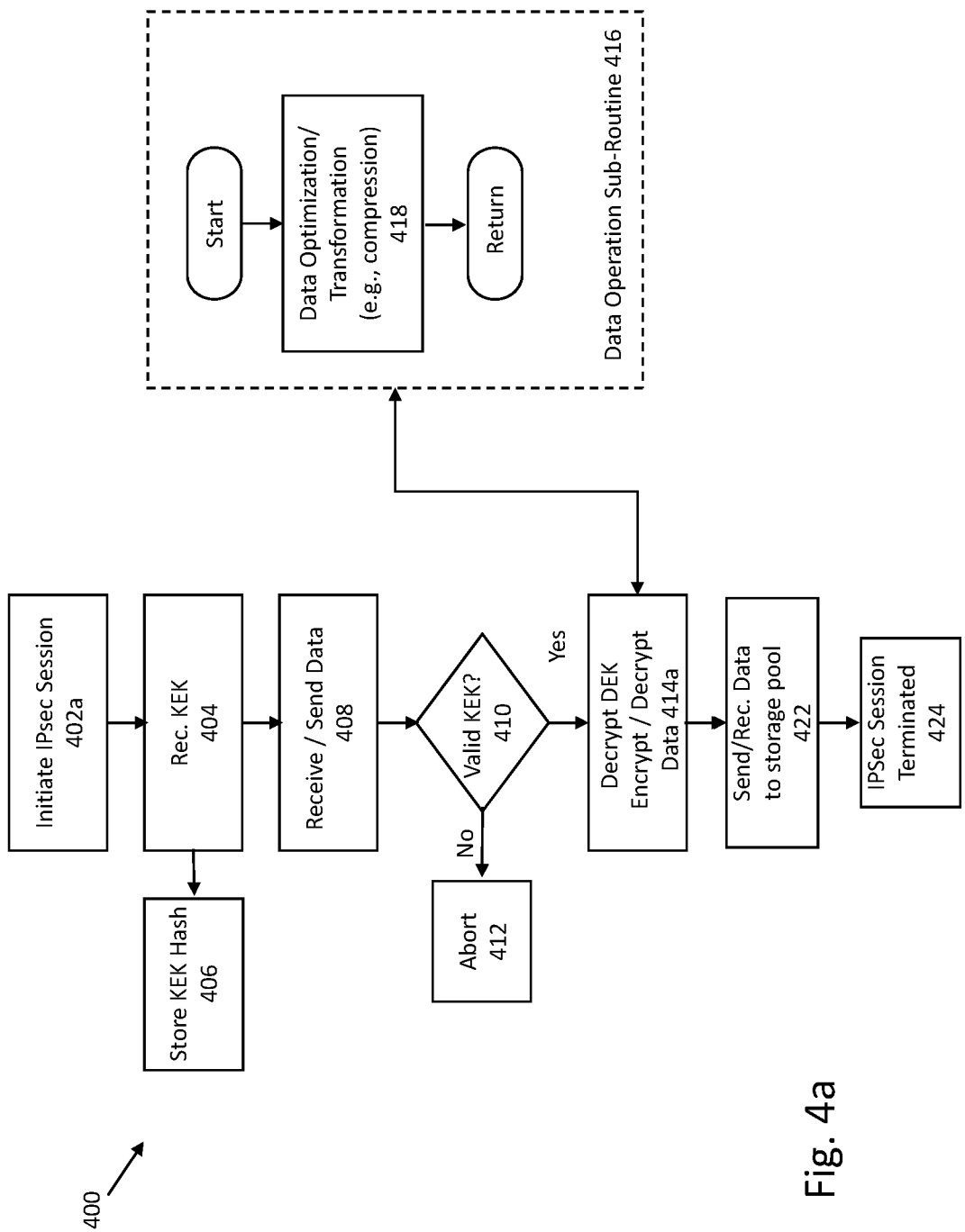
FIG. 4a shows a flowchart for an approach for efficient full-path encryption including use of data optimization/transformation operations, as according to some embodiments.
Figure 4B:
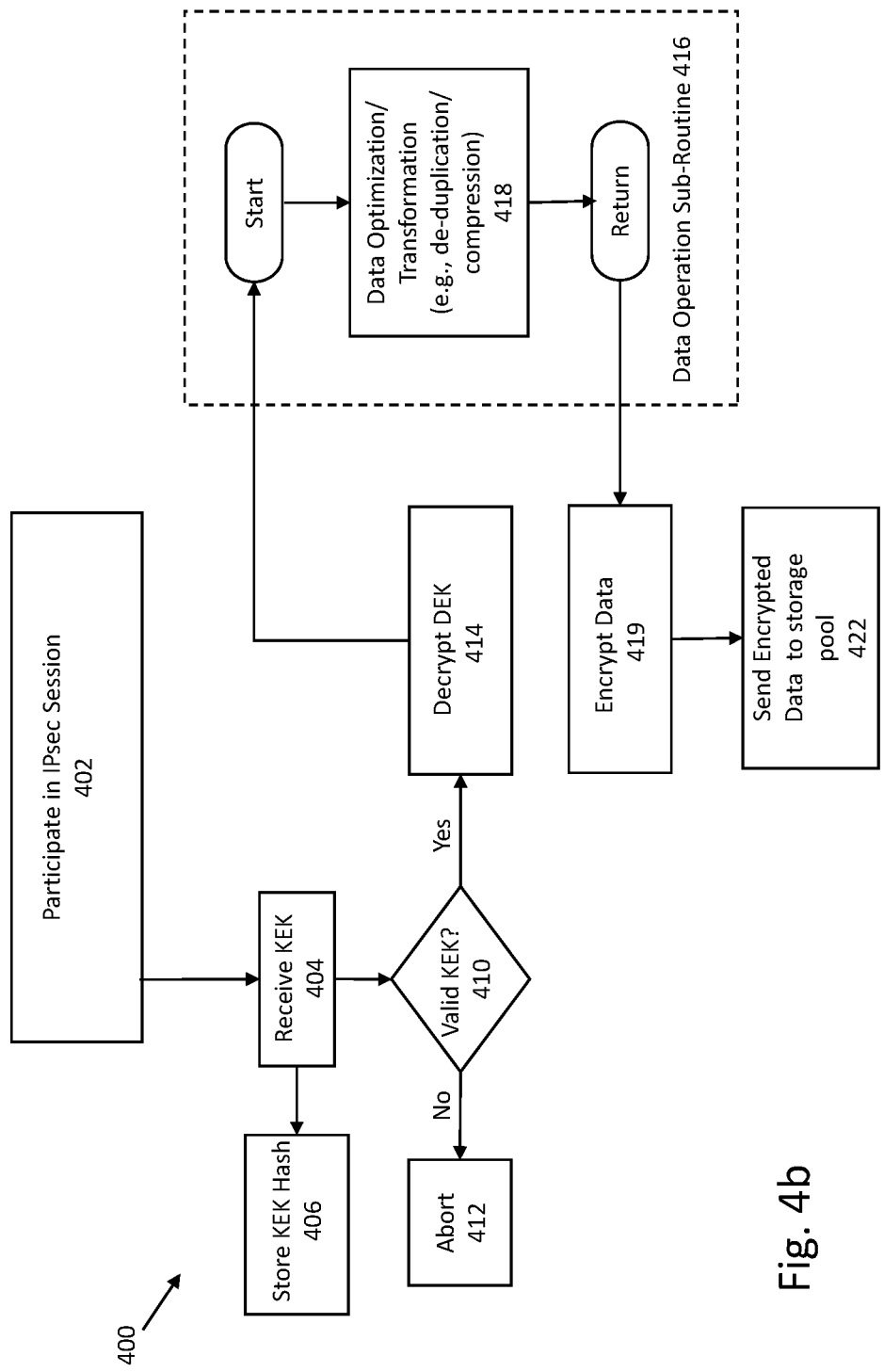
FIG. 4b shows a flowchart for an approach for efficient full-path encryption including use of data optimization/transformation operations for a first write request.
Figure 4C:
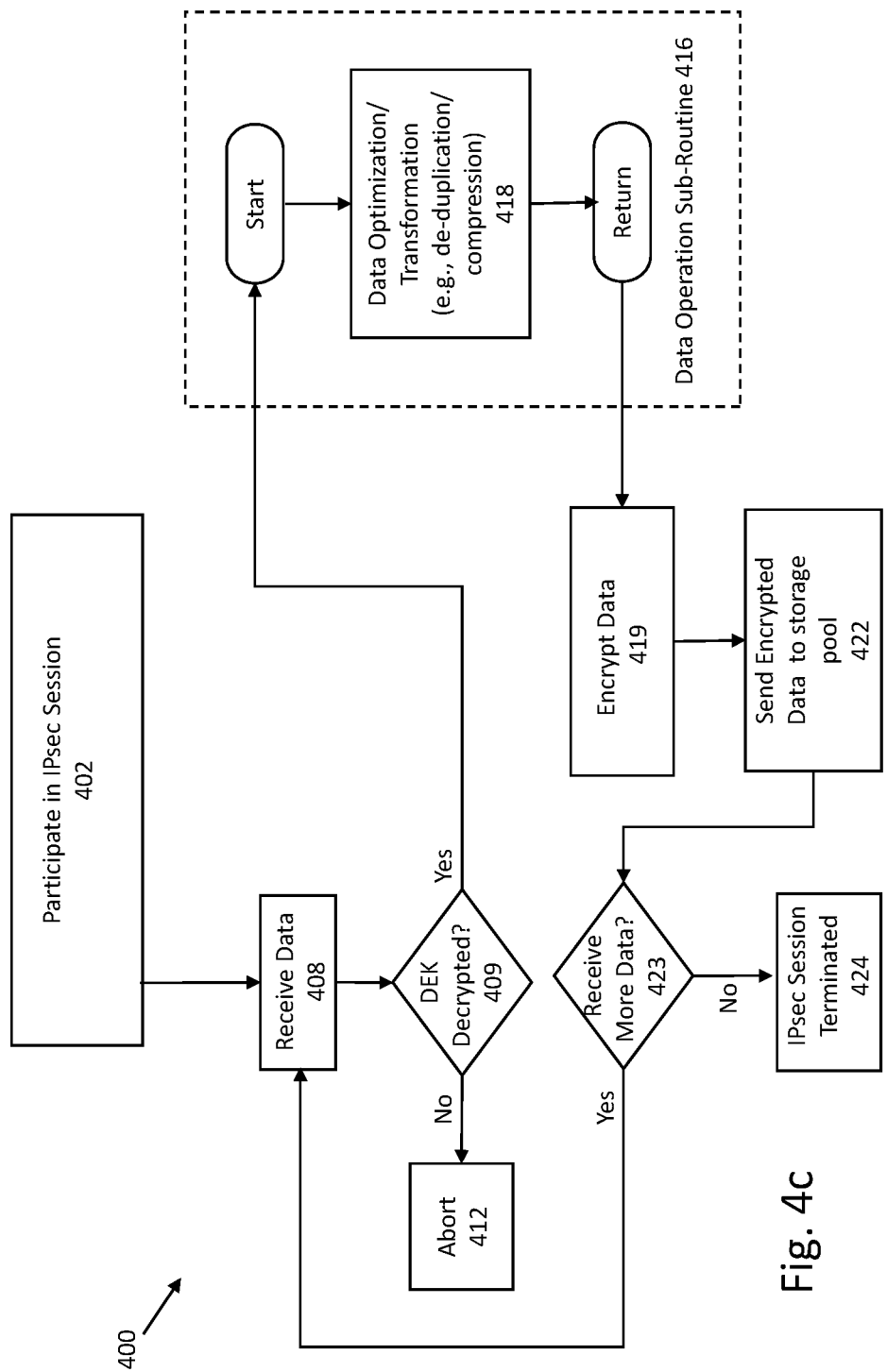
FIG. 4c shows a flowchart for an approach for efficient full-path encryption including use of data optimization/transformation operations for subsequent write requests after an initial write request.
Figure 4D:
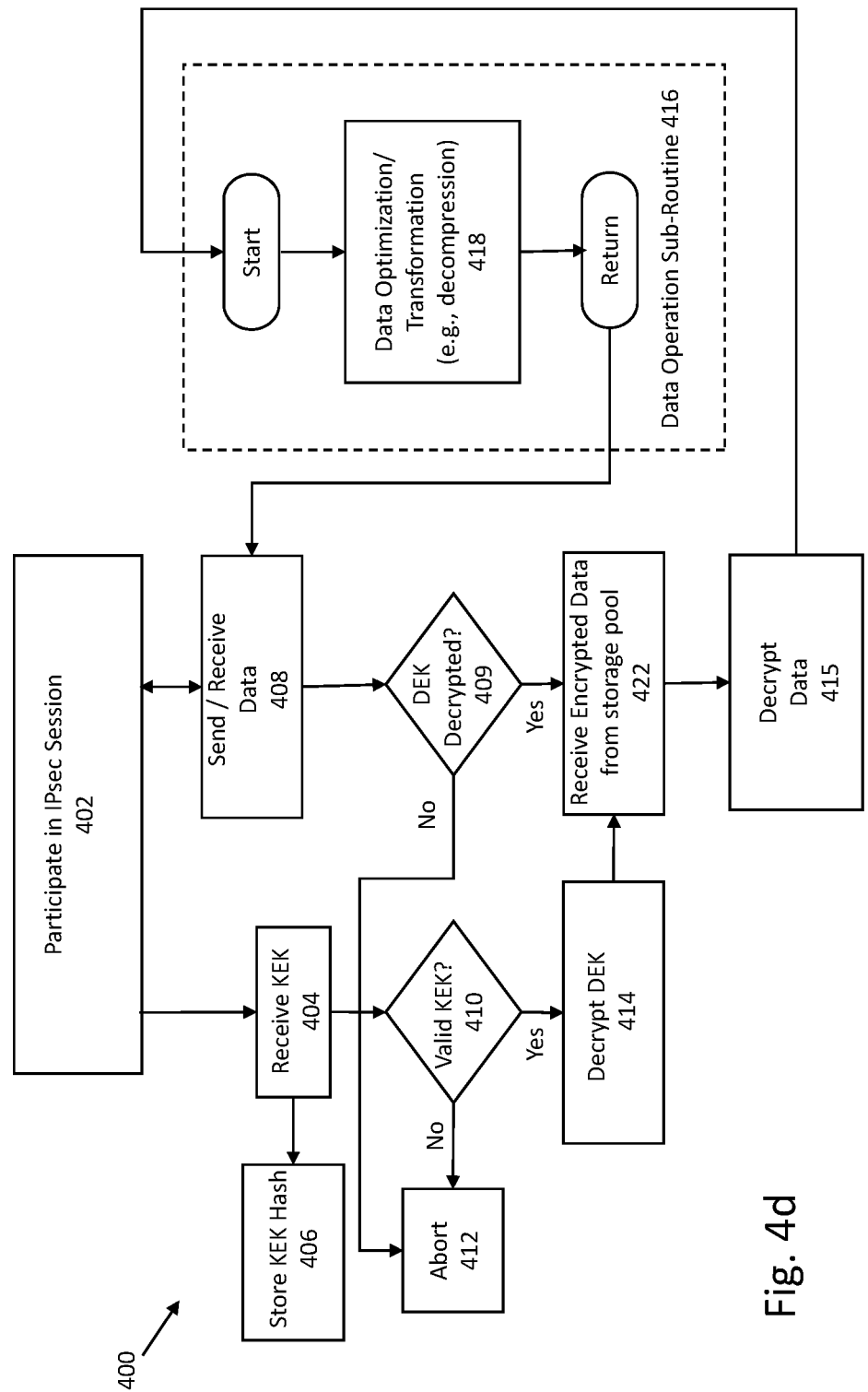
FIG. 4d shows a flowchart for an approach for efficient full-path encryption including use of data optimization/transformation operations for read requests.

FIG. 4a shows a flowchart 400 for an approach for implementing data optimization with full-path encryption, as according to some embodiments. FIG. 4b shows a flowchart for an approach for efficient full-path encryption including use of data optimization/transformation operations for a first write request. FIG. 4c shows a flowchart for an approach for efficient full-path encryption including use of data optimization/transformation operations for subsequent write requests after an initial write request. FIG. 4d shows a flowchart for an approach for efficient full-path encryption including use of data optimization/transformation operations for read requests. In some embodiments, a first virtualized computer, such as a user VM or a user container, initiates an IPsec session with a second virtualized computer, such as a controller VM or a controller container instance, wherein the second virtualized computer participates in the IPsec session. In other embodiments, a second virtualized computer, such as a controller VM, may initiate and participate in the IPsec session.

Referring to FIG. 4a, at 402a, a first virtualized computer, such as a user VM, may initiate an IPsec session with a second virtualized computer, such as a controller VM. At 404, the first virtualized computer sends a network communication (such as an iSCSI request) including an authentication key, e.g., a KEK via the IPsec session. The second virtualized computer may receive the KEK, compare KEK hashes, and store the KEK hash to authenticate the entire session (e.g., the session between the first and second virtualized computers), as illustrated at 406. In some embodiments, the authentication may exist only for each transaction, in which case, the KEK steps 404 and 406 may be repeated for each transaction. The second virtualization computer may further receive data to store along with the KEK, as illustrated at 408. One of ordinary skill in the art appreciates that the network communication sent by the user VM is a data storage access request to one or more storage devices and the data storage access request may be in any format similar to an iSCSI request (e.g., NFS request, CIFS request, etc.).

At 410, the second virtualized computer may authenticate the KEK, for example, by trying to decrypt the second key, the DEK, using the KEK. If the KEK does not successfully decrypt the DEK, then the operation may be aborted at 412, where an error message may be returned to the first virtualization computer. At 414a, if the KEK is valid, then the KEK may be used to decrypt the DEK. The DEK may be used to encrypt/decrypt the network communication. At 422, the network communication encrypted with the DEK may be sent to a storage pool, such as global storage pool 360 (see FIG. 3) for long-term or permanent storage. At 424, the IPsec session may then be terminated if the session is over. If more information is to be transmitted, the IPsec session may be kept open.

In contrast to conventional approaches, the approach shown in FIG. 4a can include one or more data operation sub-routines 416 that can improve performance by compressing or de-duplicating ("de-duping") the data, for instance.

For example, in the path from the user VM to the storage pool (e.g., write path), the user VM may send the write-data along with the KEK to the controller VM. Because the write-data was sent from the user VM as an unencrypted data structure (but through an encrypted channel via IPsec), the controller VM can still perform data optimizations on the decrypted write data (e.g., decrypted via IPsec), as illustrated at 418. Once the data optimizations are complete, the controller VM may then use the KEK/DEK scheme to encrypt the optimized/transformed write data and send the encrypted data to be stored in the storage pool at 422.

As a second example, in the path from the storage pool to the user VM (e.g., read path), the controller VM may retrieve read-data from the storage pool. As the read-data was encrypted and stored using the DEK, the controller VM can use the DEK (for a given user VM) to decrypt the data and send it to the user VM via IPsec.

FIG. 4b shows a flowchart for an approach for efficient full-path encryption including use of data optimization/transformation operations for a first write request when the transaction needs to be initially authenticated. At 402, the second virtualized computer, such as a controller VM, participates in the IPsec session initiated by a first virtualized computer, such as a user VM. The first virtualized computer sends a network communication (such as an iSCSI write request) including an authentication key such as a KEK. At 404, the second virtualized computer may receive the KEK, compare KEK hashes, and store the KEK hash to authenticate the entire session (e.g., the session between the first and second virtualized computers), as illustrated at 406.

At 410, the second virtualized computer may authenticate the KEK, for example, by trying to decrypt the second key, the DEK, using the KEK. If the KEK does not successfully decrypt the DEK, then the operation may be aborted at 412, where an error message may be returned to the first virtualization computer. If the KEK is valid, the DEK may be decrypted using the KEK at 414. The decrypted network communication may be processed by the data operation sub-routine at 416 to improve system performance such as compressing or de-duping the data, for instance. After completing the data operation sub-routine at 416 (e.g., data optimization/transformation such as de-duplication and/or data compression at 418), the optimized/transformed network communication may be encrypted at 419 using the KEK/DEK authentication/encryption scheme before the encrypted network communication is sent to be stored in the storage pool at 422, such as global storage pool 360 (see FIG. 3), for long-term or permanent storage. In some embodiments, the second virtualized computer may authenticate the user VM using the KEK for only a network transaction, in which case, FIG. 4b may be repeated for each network transaction. However, in other embodiments, the second virtualized computer may authenticate the user VM for the entire session, in which case, FIG. 4c may be implemented for subsequent write requests when the user VM has already been authenticated for additional processing.

FIG. 4c shows a flowchart for an approach for efficient full-path encryption including use of data optimization/transformation operations for subsequent write requests after an initial write request, e.g., when a network transaction may be authenticated for an entire session or the user VM is already authenticated for subsequent network transaction processing. The IPsec session from FIG. 4b may still be active and the second virtualized computer (e.g., the controller VM) may still be receiving at 408 additional requests for writing network communications to storage. At 409, a determination is made whether the network communication (data) received at 408 has been IPsec authenticated and the DEK has been decrypted. If no, the transaction is aborted at 412. If yes, the network communication (data) may be processed by the data operation sub-routine at 416 to improve system performance such as compressing or de-duping the data, for instance. After completing the data operation sub-routine at 416 (e.g., data optimization/transformation such as de-duplication and/or data compression at 418), the optimized/transformed network communication may be encrypted at 419 using the KEK/DEK authentication/encryption before the encrypted network communication/data is sent to be stored in the storage pool at 422, such as global storage pool 360 (see FIG. 3) for long-term or permanent storage. At 423, if there are more storage activity requests, the process continues to receive additional network communication (e.g., network data) at 408. However, if there are no more storage activity requests (e.g., network communications) to be received, the IPsec session may then be terminated at 424 if the session is over. In some embodiments, another process (e.g., user VM) may terminate the IPsec session. In other embodiments, the IPsec session may be terminated by the second virtualized computer (e.g., upon exceeding some timeout period).

FIG. 4d shows a flowchart for an approach for efficient full-path encryption including use of data optimization/transformation operations for read requests. Read requests from a user VM may be processed by the controller VM starting at 402 and proceed to either 404 or 408, depending on whether the read request transaction requires authentication or not. As discussed above, the controller VM may authenticate the user VM by each transaction or for an entire session or for a certain period of time. In some embodiments, the controller VM may authenticate the user VM for an entire session. The initial read request transaction will require authentication and thus will start at 404 and proceed to validating the KEK at 410 and decrypting the DEK at 414. Subsequent read requests, once authentication is no longer required, will start at 408 and proceed to determining whether the DEK is decrypted at 409. In other embodiments, if the controller VM authenticates the user VM by each transaction, then the initial and subsequent read requests will start at 404 and proceed to validate the KEK at 410 and decrypting the DEK at 414 as previously discussed above.

At 422, once it is determined the read request is from an authenticated user VM and the DEK has been decrypted, the controller VM may retrieve the requested encrypted read-data from the storage pool. As the read-data was encrypted and stored using the DEK (as shown above in FIG. 4a-4c at steps 414a and 419), the controller VM may use the DEK (for a given user VM) to decrypt the data at 415. For the read path, the decrypted data from 415 may require data operation subroutine 416 to transform the data (e.g., decompression) before sending the data to 408 and ultimately to the user VM via IPsec at 402.

Figure 5:
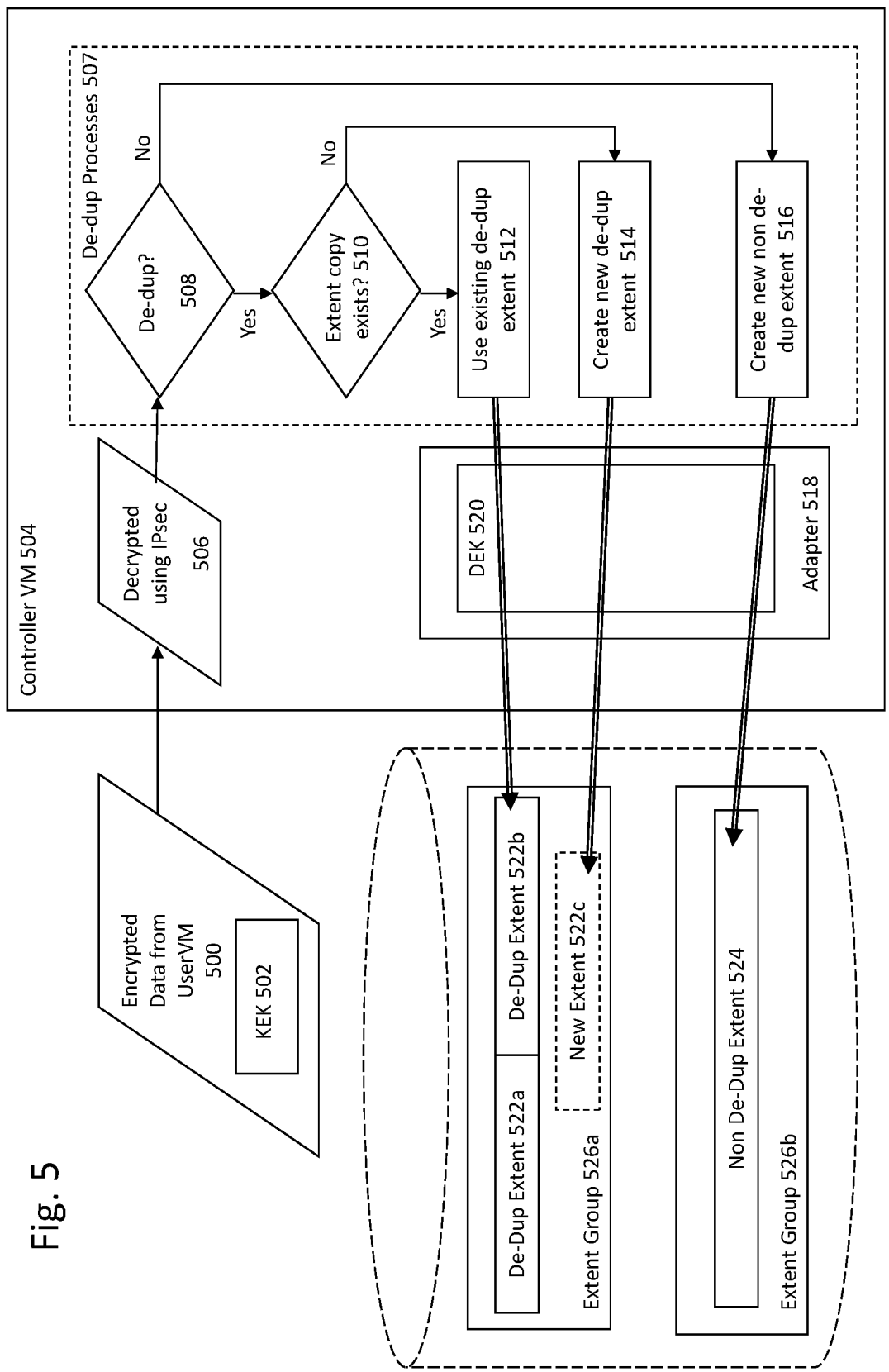
FIG. 5 illustrates an example data optimization operation using full-path encryption, as according to some embodiments.

FIG. 5 illustrates an example data optimization approach using deduplication in a full-path encrypted system. In some embodiments of the invention, the basic unit of de-duplication is an extent, which is a contiguous portion of storage on a given storage device. Multiple extents can be collected together and stored within an "extent group. The left portion of FIG. 5 illustrates two extent groups 526a and 526b. Extent group 526a includes de-duplication with existing de-duplication extents 522a and 522b. Extent group 526b includes a non-de-duplication extent 524. As described in more detail below, new extents (such as extent 522c) can be added to an existing extent group, e.g. the extent group 526a, if there is sufficient space in the existing extent group.

Assume that a user issues an I/O request to write an item of data 500 to storage. As explained above, in some embodiments, the item of data may be accompanied by a first key, the KEK 502. At 506, the controller VM receives the request and decrypts the request using IPsec.

In contrast to conventional approaches, once the data item 500 is decrypted using IPsec, additional optimizations, such as de-deduplication processes 507 may be performed. As such, the controller VM 504 will perform a process to analyze the data item 500 and assign that data item 500 to an extent for storage. At 508, a determination is made whether de-duplication is desired or enabled. If not, then at 516, a new non-de-duplication extent 524 is created within an appropriate extent group 526b to store the data item 500. As illustrated the operation to store the data is passed through an adapter 518. The adapter 518 may use the KEK 502 to decrypt the DEK 520, and may use the DEK 520 to encrypt the data item 500 and store it as encrypted data in non de-dup extent 524.

If de-duplication is enabled, then a further determination is made at 510 whether the storage system already includes a copy of that data item. According to some embodiments, this is accomplished by performing "Rabin fingerprinting" upon the data that is being stored. Rabin fingerprinting is a known algorithm for objectively dividing data into consistent portions. This algorithm creates uniform and common boundaries for data portions that are partitioned out of larger items of data. As mentioned above, conventional approaches that encrypt the data before it is sent (e.g., using an encryption driver) would not generate matchable Rabin fingerprints. For example, if data item is pre-encrypted, the structure of the data item is scrambled. As such, the Rabin fingerprint of the scrambled data item would not match any other data item already in storage (even if identical data items exist) and Rabin fingerprinting techniques would not be practical.

Further details regarding an exemplary approach that can be taken to identify extents for de-duplication are described in U.S. patent application Ser. No. 13/207,375, titled "METHOD AND SYSTEM FOR IMPLEMENTING FAST DATA CONVOLUTION USING SLIDING WINDOWS", which is hereby incorporated by reference in its entirety.

The SHA1 algorithm is applied to the data portion created by Rabin fingerprinting to create a unique signature for that data portion. This is a well-known hashing algorithm that takes any set of arbitrary data and creates a 20-byte content-based signature. The SHA1 algorithm creates a value that is used as an extent identifier (extent ID), which is further used to determine if an earlier copy of the data item 500 has already been stored in the storage system.

If a copy already exists, then a new copy of the data item 500 is not stored; instead, the existing copy stored in de-dup extent 522b is used. A "ref_count" (or reference count) for that extent 522b would be incremented to provide notice that a new entity is now relying upon this extent 522b to store the data item 500. However, if a copy of the data item 500 does not yet exist, then a new extent 522c is created to store the data item 500. Similar to the storing operation for 524, the modifications to extent group 526a may also occur through the KEK/DEK encryption path, as implemented by the adapter 518.

The sizes of the extents and extent groups for the invention can be chosen to suit any desired performance goals. In some embodiments, the extent groups are implemented as 64 Mbyte size files. The non-deduplicated extents are created to have a much larger size than the deduplicated extents. For example, the non-deduplicated extents may be implemented with 1 Mbyte sizes and the deduplicated extents implemented with 8 Kbyte sizes. The goal of this sizing strategy is to make the deduplicated extents as small as practical to facilitate duplications while the non-deduplicated extents are made as large as practical to facilitate efficient physical I/O operations and to prevent the metadata (e.g., the number of rows of metadata) from bloating.

In this way, full-path encryption is provided: in-flight data between virtualized computers is protected by IPsec and at-rest data (e.g., data stored in the storage pool) is protected by DEK encryption. Further increased security is provided by using the KEK—as sent from the user VM—to authenticate the user VM. Further, increased network/storage optimizations are provided because the controller VMs can still perform maintenance tasks, such as compression and de-duplication on decrypted data, whether the data is decrypted using IPsec or KEK/DEK-scheme.

Figure 6:
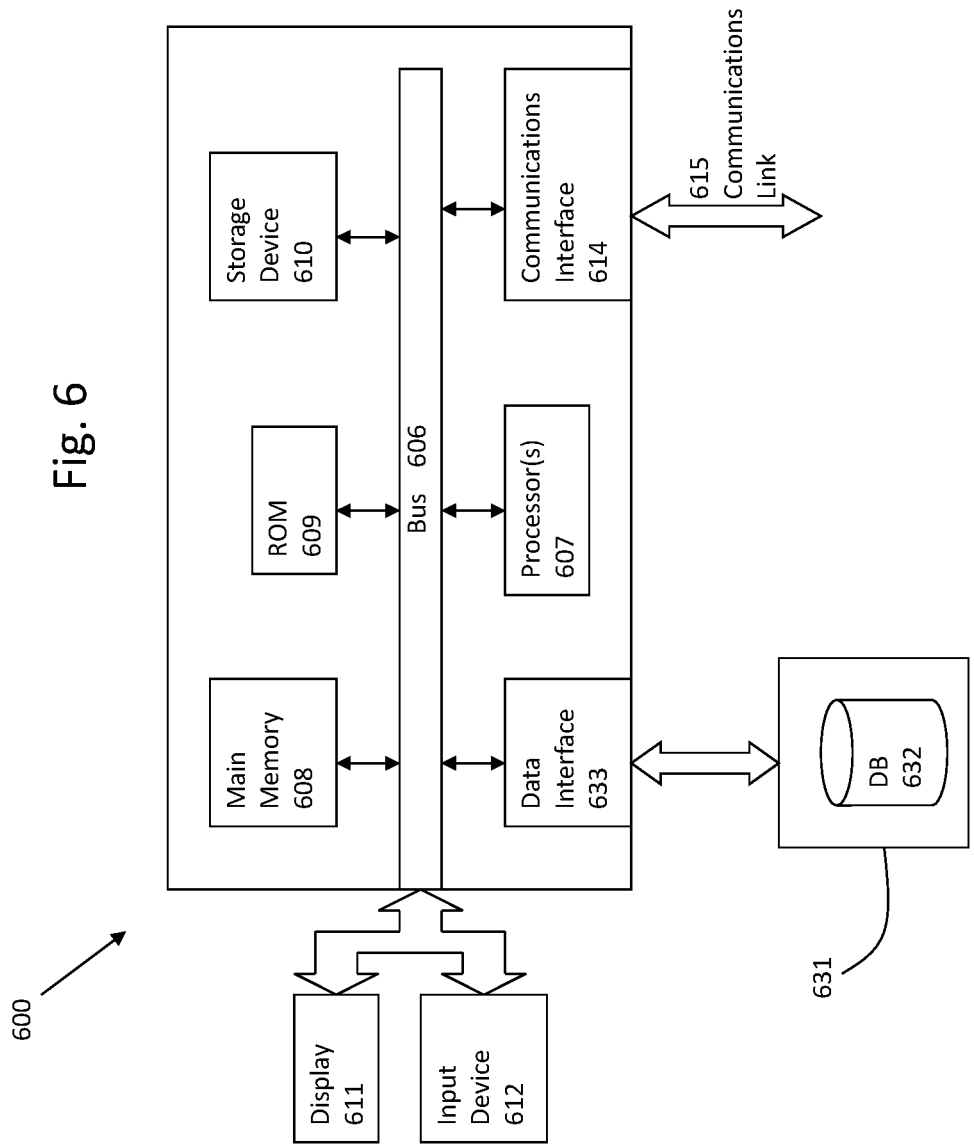
FIG. 6 illustrates an example system architecture.

FIG. 6 is a block diagram of an illustrative computing system 600 suitable for implementing an embodiment of the present invention. Computer system 600 includes a bus 606 or other communication mechanism for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control.

According to one embodiment of the invention, computer system 600 performs specific operations by processor 607 executing one or more sequences of one or more instructions contained in system memory 608. Such instructions may be read into system memory 608 from another computer readable/usable medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608. A data interface 633 may be employed to access a database 632 on computer readable medium 631.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program, i.e., application code, through communication link 615 and communication interface 614. Received program code may be executed by processor 607 as it is received, and/or stored in disk drive 610, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

Figure 7A:
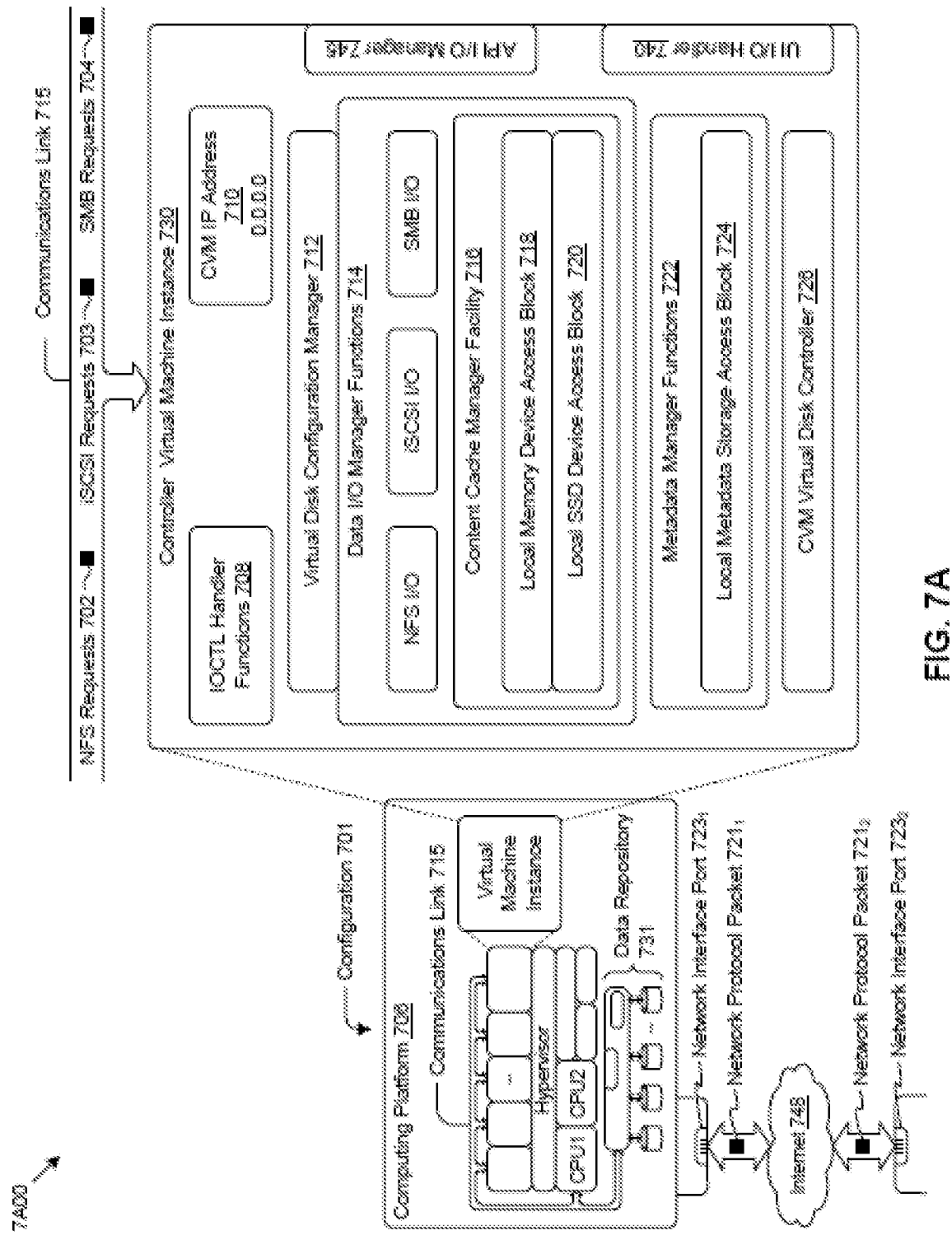
FIG. 7A illustrates architectures comprising collections of interconnected components suitable for implementing embodiments of the present disclosure and/or for use in the herein-described environments.

FIG. 7A depicts a virtual machine architecture 7A00 comprising a collection of interconnected components suitable for implementing embodiments of the present disclosure and/or for use in the herein-described environments. The shown virtual machine architecture 7A00 includes a virtual machine instance in a configuration 701 that is further described as pertaining to the controller virtual machine instance 730. A controller virtual machine instance receives block I/O (input/output or IO) storage requests as network file system (NFS) requests in the form of NFS requests 702, and/or internet small computer storage interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., see CVM IP address 710. Various forms of input and output (I/O or IO) can be handled by one or more IO control handler functions (see IOCTL functions 708) that interface to other functions such as data IO manager functions 714 and/or metadata manager functions 722. As shown, the data IO manager functions can include communication with a virtual disk configuration manager 712 and/or can include direct or indirect communication with any of various block IO functions (e.g., NFS IO, iSCSI IO, SMB IO, etc.).

In addition to block IO functions, the configuration 701 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through the shown API IO manager 745.

The communications link 715 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 730 includes a content cache manager facility 716 that accesses storage locations, possibly including local dynamic random access memory (DRAM) (e.g., through the local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 731, which in turn can be formatted into any one or more storage areas, and which can comprise parameterized storage accessible by a key (e.g., a filename, a table name, a block address, an offset address, etc.). An external data repository 731 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 724. The external data repository 731 can be configured using a CVM instance virtual disk controller 726, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of a configuration 701 can be coupled by a communications link 715 (e.g., backplane, LAN, PTSN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port 723$_1$ and network interface port 723$_2$). The configuration 701 can be addressed through one or more network interface ports using an IP address. Any operational element within computing platform 706 can perform sending and receiving operations using any of a range of network protocols, possibly including network protocols that send and receive packets (e.g., see network protocol packet 721$_1$ and network protocol packet 721$_2$).

The computing platform 706 may transmit and receive messages that can be composed of configuration data, and/or any other forms of data and/or instructions organized into a data structure (e.g., communications packets). In some cases, the data structure includes program code instructions (e.g., application code) communicated through Internet 748 and/or through any one or more instances of communications link 715. Received program code may be processed and/or executed by a CPU as it is received and/or program code may be stored in any volatile or non-volatile storage for later execution. Program code can be transmitted via an upload (e.g., an upload from an access device over the Internet 748 to computing platform 706). Further, program code and/or results of executing program code can be delivered to a particular user via a download (e.g., a download from the computing platform 706 over the Internet 748 to an access device).

The configuration 701 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics of multi-cluster cryptographic checksum monitoring.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of multi-cluster cryptographic checksum monitoring with centralized reporting services). Such files or records can be brought into and/or stored in volatile or non-volatile memory.

Figure 7B:
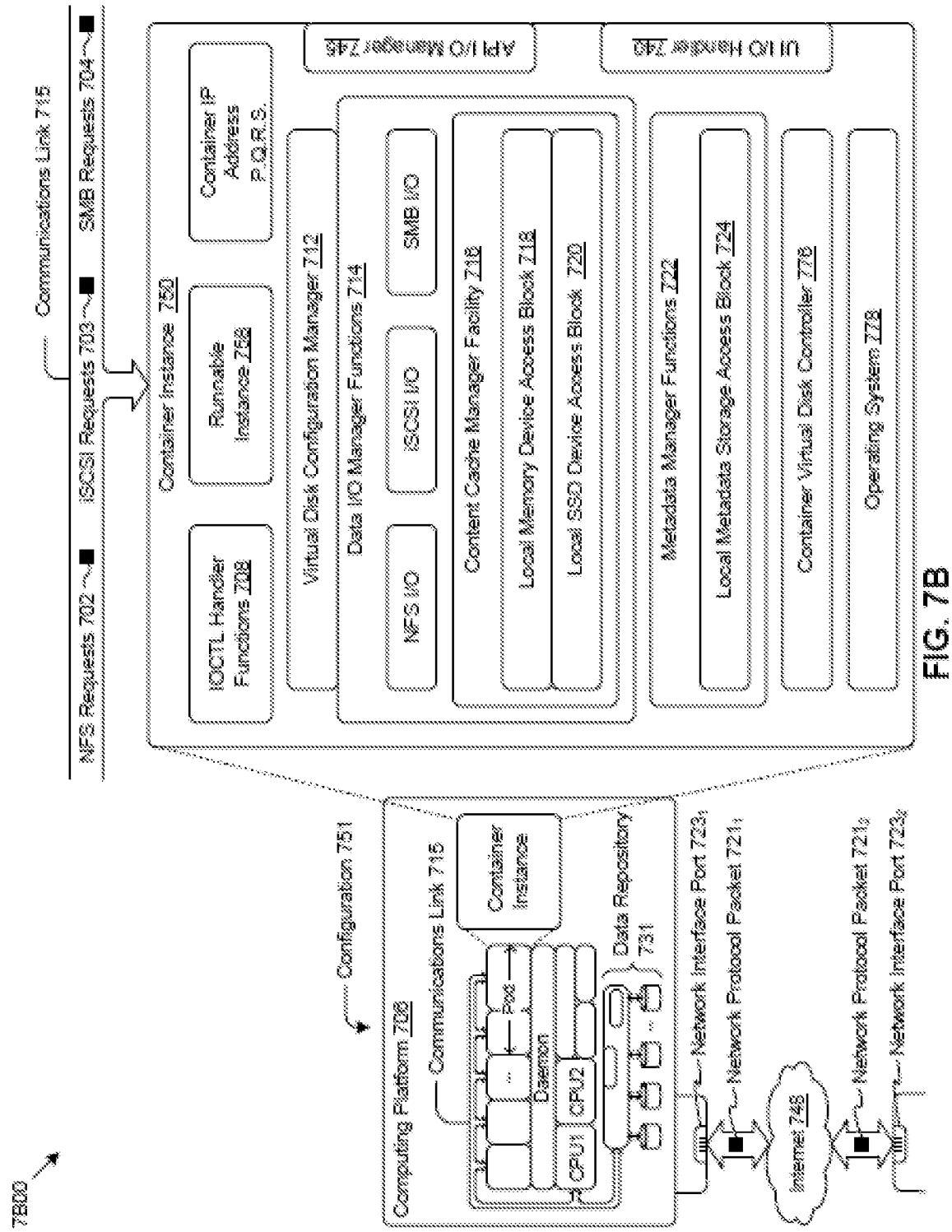
FIG. 7B illustrates architectures comprising collections of interconnected components suitable for implementing embodiments of the present disclosure and/or for use in the herein-described environments.

FIG. 7B depicts a containerized architecture 7B00 comprising a collection of interconnected components suitable for implementing embodiments of the present disclosure and/or for use in the herein-described environments. The shown containerized architecture 7B00 includes a container instance in a configuration 751 that is further described as pertaining to the container instance 750. The configuration 751 includes a daemon (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The daemon can perform port forwarding to any container (e.g., container instance 750). A container instance can be executed by a processor. Runnable portions of a container instance sometimes derive from a container image, which in turn might include all, or portions of any of, a Java archive repository (JAR) and/or its contents, a script or scripts and/or a directory of scripts, a virtual machine configuration, and may include any dependencies therefrom. In some cases, a virtual machine configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container (e.g., a Docker container) can be rooted in a directory system, and can be accessed by file system commands (e.g., "ls" or "ls-a", etc.). The container might optionally include an operating system 778, however such an operating system need not be provided. Instead, a container can include a runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments multiple containers can be collocated and/or share one or more context. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for optimizable full-path encryption in a virtualization environment, comprising:
    implementing an encrypted communication over a network session between a first virtual machine and a second virtual machine, wherein
        the second virtual machine executes as a virtualization controller that manages a storage pool having a first local storage on a host and a second local storage on a separate host in a virtualization environment;
    obtaining, at the second virtual machine, data in the encrypted communication at least by decrypting the encrypted communication;
    performing, by the second virtual machine, an optimization or transformation operation on the data for storage onto a specific local storage in the storage pool; and
    determining by the second virtual machine the specific local storage in the storage pool from at least the first local storage and the second local storage based at least in part on a frequency of access to the data and a category into which the data has been categorized.

2. The method of claim 1, wherein the optimization or transformation operation includes at least one of data deduplication, data compression, or data encoding in a different encoding scheme that is different form an encryption scheme used to encrypt the encrypted communication.

3. The method of claim 1, wherein the optimization or transformation operation includes an encryption operation that encrypts the data using a key.

4. The method of claim 1, wherein an Internet layer security protocol is used in encrypting or decrypting a communication over the network session, the communication corresponds to a data storage access request, a first key used in decrypting a second key comprises a key encryption key ("KEK"), and the second key comprises a data encryption key ("DEK").

5. The method of claim 4, wherein the KEK authenticates network communications for an entire network session between the first virtual machine and the second virtual machine.

6. The method of claim 5, wherein a subsequent write request is issued after an initial iSCSI request in the network session, and the method further comprises:
    encrypting IPsec decrypted data, which is received as a separate encrypted communication and upon which the optimization or transformation operation has been performed, into encrypted data using the second key for storage in the storage pool.

7. A computer program product embodied on a non-transitory computer readable medium having stored thereon a sequence of instructions which, when executed by a processor, causes the processor to execute a set of acts, the set of acts comprising:
    implementing an encrypted communication over a network session between a first virtual machine and a second virtual machine, wherein
        the second virtual machine executes as a virtualization controller that manages a storage pool having a first local storage on a host and a second local storage on a separate host in a virtualization environment;
    obtaining, at the second virtual machine, data in the encrypted communication at least by decrypting the encrypted communication; and
    performing, by the second virtual machine, an optimization or transformation operation on the for storage onto a specific local storage in the storage pool; and
    determining by the second virtual machine the specific local storage in the storage pool from at least the first local storage and the second local storage based at least in part on a frequency of access to the data and a category into which the data has been categorized.

8. The computer program product of claim 7, wherein the optimization or transformation operation comprises at least one of data deduplication, data compression, or data encoding in a different encoding scheme that is different form an encryption scheme used to encrypt the encrypted communication.

9. The computer program product of claim 7, wherein an Internet layer security protocol is used in encrypting a communication over the network session the communication corresponds to a data storage access request, a first key used in decrypting a second key comprises a key encryption key ("KEK"), and the second key comprises a data encryption key ("DEK").

10. The computer program product of claim 9, wherein the KEK authenticates network communications for an entire network session between; the first virtual machine and the second virtual machine.

11. The computer program product of claim 10, wherein a subsequent write request is issued after an initial iSCSI request in the network session, and the set of acts further comprises:
    encrypting IPsec decrypted data, which is received as a separate encrypted communication and upon which the optimization or transformation operation has been performed, into encrypted data using the second key for storage in the storage pool.

12. A system, comprising:
a computer processor to execute a set of program code instructions; and
a memory to hold the set of program code instructions which, when executed by the computer processor, causes the computer processor at least to:
implement an encrypted communication over a network session between a first virtual machine and a second virtual machine, wherein
the second virtual machine executes as a virtualization controller that manages a storage pool having a first local storage on a host and a second local storage on a separate host in a virtualization environment;
obtain, at the second virtual machine, data in the encrypted communication at least by decrypting the encrypted communication; and
performing, by the second virtual machine, an optimization or transformation operation on the data for storage onto a specific local storage in the storage pool; and
determining by the second virtual machine the specific local storage in the storage pool from at least the first local storage and the second local storage based at least in part on a frequency of access to the data and a category into which the data has been categorized.

13. The system of claim 12, wherein the optimization or transformation operation comprises at least one of data deduplication, data compression, or data encoding in a different encoding scheme.

14. The system of claim 12, wherein the memory holds the set of program code instructions which, when executed by the computer processor, further causes the computer processor at least to encrypt the data using a key after performing the optimization or transformation operation.

15. The system of claim 12, wherein an Internet layer security protocol is used in encrypting or decrypting a communication over the network session, the communication corresponds to a data storage access request, a first key used in decrypting a second key comprises a key encryption key ("KEK"), and the second key comprises a data encryption key ("DEK").

16. The system of claim 15, wherein the KEK authenticates network communications for an entire network session between the first virtual machine and the second virtual machine.

17. The system of claim 16, wherein a subsequent write request issued after an initial iSCSI request in the network session, and the method further comprises:
encrypting IPsec decrypted data which is received as a separate encrypted communication and upon which the optimization or transformation operation has been performed into encrypted data using the second key for storage in the storage pool.

18. A computer program product embodied on a non-transitory computer readable medium having stored thereon a sequence of instructions which, when executed by a processor, causes the processor to execute a set of acts, the set of acts comprising:
implementing an encrypted communication over a network session between a first virtual machine and a second virtual machine, wherein
the second virtual machine executes as a virtualization controller that manages a storage pool having a first local storage on a host and a second local storage on a separate host in a virtualization environment;
obtaining, at the second virtual machine, data in the encrypted communication at least by decrypting the encrypted communication; and
performing, by the second virtual machine, an optimization or transformation operation on the data for storage onto a specific local storage in the storage pool, wherein the second virtual machine determines the specific local storage from storage pool based at least in part upon an analysis result of the data, wherein
an Internet layer security protocol is used in encrypting or decrypting a communication over the network session, the communication corresponds to a data storage access request, a first key used in decrypting a second key comprises a key encryption key ("KEK"), and the second key comprises a data encryption key ("DEK").

19. The computer program product of claim 18, wherein performing the optimization or transformation operation comprises enhancing performance of the first virtual machine or the second virtual machine at least by:
determining the specific local storage from at least the first local storage and the second local storage for storing the data, upon which the optimization or transformation operation has been performed, wherein the analysis result includes a frequency of access to the data and a category into which the data has been categorized.

20. The computer program product of claim 18, wherein a subsequent write request is issued after an initial iSCSI request in the network session, and the set of acts further comprises:
encrypting IPsec decrypted data, which is received as a separate encrypted communication and upon which the optimization or transformation operation has been performed, into encrypted data using the second key for storage in the storage pool.

21. A method, comprising:
implementing an encrypted communication over a network session between a first virtual machine and a second virtual machine, wherein
the second virtual machine executes as a virtualization controller that manages a storage pool having a first local storage on a host and a second local storage on a separate host in a virtualization environment;
obtaining, at the second virtual machine, data in the encrypted communication at least by decrypting the encrypted communication; and
performing, by the second virtual machine, an optimization or transformation operation on the data for storage onto a specific local storage in the storage pool, wherein the second virtual machine determines the specific local storage from storage pool based at least in part upon an analysis result of the data, wherein
an Internet layer security protocol is used in encrypting or decrypting a communication over the network session, the communication corresponds to a data storage access request, a first key used in decrypting a second key comprises a key encryption key ("KEK"), and the second key comprises a data encryption key ("DEK").

22. The method of claim 21, wherein performing the optimization or transformation operation comprises enhancing performance of the first virtual machine or the second virtual machine at least by:
determining the specific local storage from at least the first local storage and the second local storage for storing the data, upon which the optimization or transformation operation has been performed, wherein the analysis result includes a frequency of access to the data and a category into which the data has been categorized.

23. The method of claim 21, wherein a subsequent write request is issued after an initial iSCSI request in the network session, and the set of acts further comprises:

encrypting IPsec decrypted data, which is received as a separate encrypted communication and upon which the optimization or transformation operation has been performed, into encrypted data using the second key for storage in the storage pool.

\* \* \* \* \*